W. Beach,
Meat Tenderer,
Nº 9,932. Patented Aug. 16, 1853.
Fig: 1
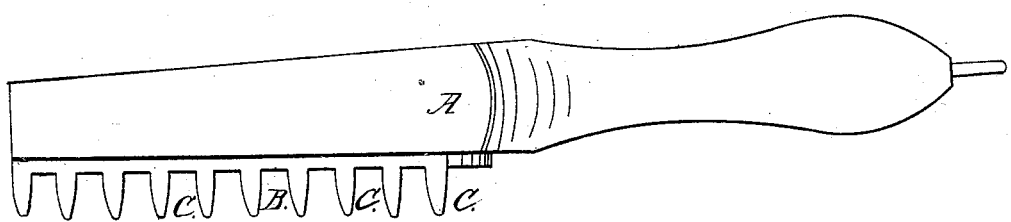
Fig: 2.
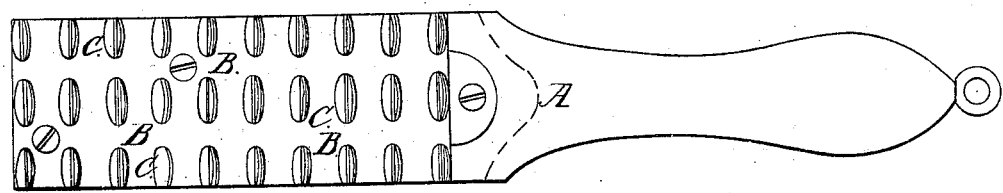
Fig. 3.
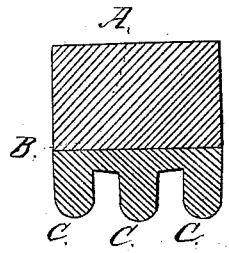

UNITED STATES PATENT OFFICE.

WILLIAM BEACH, OF PHILADELPHIA, PENNSYLVANIA.

MEAT-TENDERER.

Specification of Letters Patent No. 9,932, dated August 16, 1853.

*To all whom it may concern:*

Be it known that I, WILLIAM BEACH, of the city and county of Philadelphia and State of Pennsylvania, have invented a new and useful Instrument for Making Meat Tender, called "Beach Meat-Maul," which is described as follows, reference being had to the annexed drawings of the same, making part of this specification.

Figure 1 is a side elevation of this improved meat maul. Fig. 2 is a view of the under surface of ditto. Fig. 3 is a cross section of ditto.

Similar letters in the figures refer to corresponding parts.

The nature of this invention consists in securing to an oblong block of wood provided with a handle, a metallic plate of tapered teeth of such form, as when made to penetrate any meat, cut to the thickness of a steak or cutlet, by a blow, shall make the same tender and consequently more easy to masticate, and from forming punctures in the same shall enable it to be cooked quicker and with a corresponding less expenditure of fuel.

To enable others skilled in the art to make and use my invention, I will describe the exact mode of doing the same.

I take an oblong block of wood A and turn a handle at one end, leaving the opposite end rectangular, or nearly so. To the under surface of this latter portion, I secure a metallic plate B, having a series of teeth C projecting from its under part—formed in rows or otherwise as may be desired—which teeth are tapered on their sides and rounded at their lower ends to enable them to freely enter and depart from the meat without tearing or injuring the appearance of the same. The maul thus formed is taken in the right hand, or both, and the meat to be made tender is laid on a flat surface, and successively punctured on both sides until reduced to the proper state for the cuisine.

Instead of making the teeth of the form represented they may be formed with four right angled wings; and instead of casting them on a plate they may be driven into the lower surface the block of wood formed as above or otherwise, as may be desired; but the maul as represented in the drawings, is believed to be the best adapted to the purpose.

What I claim as my invention and desire to secure by Letters Patent is—

Forming a meat maul for the purpose designed, by securing to one end of an oblong block of wood, whose opposite end is formed into a handle, a series of rows of tapered teeth of the form described, cast on a plate or driven singly into the wood, as may be desired.

WILLIAM BEACH.

Witnesses:
HENRY SIMPSON,
DANIEL MCKINLEY.